(12) United States Patent
Bruening et al.

(10) Patent No.: US 7,028,458 B2
(45) Date of Patent: Apr. 18, 2006

(54) MACHINE FOR MOWING STALK-LIKE CROPS

(75) Inventors: Ulrich Bruening, Coesfeld (DE);
Klemens Weitenberg, Borken (DE);
Leo Schulze Hockenbeck, Everswinkel (DE); Martin Huening, Billerbeck (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 10/959,010

(22) Filed: Oct. 5, 2004

(65) Prior Publication Data

US 2005/0097876 A1    May 12, 2005

(30) Foreign Application Priority Data

Nov. 6, 2003   (DE)  ................................. 103 51 858

(51) Int. Cl.
*A01D 45/02* (2006.01)
(52) U.S. Cl. .......................................................... 56/51
(58) Field of Classification Search ...................... 56/6, 56/51, 53, 60, 94, 119, 16.4 A, 16.4 B, 16.4 C, 56/DIG. 5
See application file for complete search history.

(56) References Cited

U.S. PATENT DOCUMENTS

| 2,648,941 | A | * | 8/1953 | Hintz ....................... 56/16.4 R |
| 3,439,479 | A | * | 4/1969 | Phillips et al. .................. 56/94 |
| 4,353,378 | A | * | 10/1982 | Seymour .................... 460/140 |
| 4,429,516 | A | * | 2/1984 | Erickson ........................ 56/95 |
| 4,567,717 | A | * | 2/1986 | Manton ........................ 56/119 |
| 4,903,468 | A | * | 2/1990 | Haberkorn ............... 56/16.4 R |
| 5,237,804 | A | * | 8/1993 | Bertling .......................... 56/60 |
| 5,651,243 | A |   | 7/1997 | Arnold et al. |
| 5,722,225 | A |   | 3/1998 | Wuebbels et al. |
| 5,768,865 | A | * | 6/1998 | Rosenbalm et al. ............. 56/6 |
| 5,784,869 | A |   | 7/1998 | Rayfield |
| 5,845,472 | A |   | 12/1998 | Arnold |
| 6,502,378 | B1 |  | 1/2003 | Wubbels et al. |
| 6,658,832 | B1 |  | 12/2003 | Wubbels et al. |
| 6,701,702 | B1 | * | 3/2004 | Wubbels ...................... 56/103 |
| 6,775,967 | B1 |  | 8/2004 | Wubbels et al. |
| 6,826,897 | B1 |  | 12/2004 | Wübbels |
| 2003/0101703 | A1 |  | 6/2003 | Wubbels et al. |

FOREIGN PATENT DOCUMENTS

| DE | 36 23 380 | 7/1986 |
| DE | 44 41 074 | 11/1994 |
| DE | 195 27 607 | 7/1995 |
| DE | 198 56 444 | 12/1998 |
| EP | 0 861 583 | 1/1998 |
| GB | 2 012 154 | 1/1979 |

* cited by examiner

*Primary Examiner*—Thomas B. Will
*Assistant Examiner*—Alicia Torres

(57) ABSTRACT

A machine is provided for mowing of stalk-like crops, having cutting and intake mechanisms arranged side by side, for cutting and conveying of the crop material, wherewith at least one such cutting and intake mechanism is disposed on each side of the longitudinal mid-plane of the machine. The machine further includes a guide element disposed in the center of the machine above, and at the forward side of, a conveying channel through which plants being harvested are conveyed actively to an intake channel of a field chopper. The guide element includes surfaces which are disposed at a distance from the conveying channel and are disposed relative to the course of the conveying channel so that the surfaces open upward from the conveying channel in a funnel-like manner.

9 Claims, 4 Drawing Sheets

MACHINE FOR MOWING STALK-LIKE CROPS

FIELD OF THE INVENTION

The invention relates to a machine for mowing of stalk-like crops, having cutting and intake mechanisms arranged side by side, for cutting and conveying of the crop material, wherewith at least one such cutting and intake mechanism is disposed on each side of the longitudinal mid-plane of the machine, said machine further having a guide element disposed in the center of the machine above, and at the forward side of, a conveying channel in which the plants being harvested are conveyed actively to an intake channel of a field chopper.

BACKGROUND OF THE INVENTION

Machines of the type described above are used in agriculture to cut stalk-like crops, e.g. corn plants, from the soil of a field and convey them to a field chopper borne on the machine, in which chopper the plants are chopped and are discharged to a storage container on a trailer. As a rule, such machines have a number of laterally disposed cutting and intake mechanisms, each in the form of an elongated rotor rotating around a vertical axis, which rotors operate independently of the rows and which have recesses distributed around their edges, which recesses accommodate the plant stalks. Such cutting and intake mechanisms have mowing wheels disposed under said rotors, which mowing wheels serve to cut off the plant stalks generally at ground level.

In numerous such machines (DE 36 23 380 A, U.S. Pat. No. 5,651,243 A, U.S. Pat. No. 5,845,472, U.S. Pat. No. 6,775,967, US 2003/0101703, when in harvesting mode, the cutting and intake mechanisms closest to the longitudinally extending mid-plane of the machine rotate such that the plants are first transported toward said longitudinal mid-plane of the machine and then rearward in the direction of the intake channel of the field chopper. In these machines, rhomboidally shaped guide elements are employed between the cutting and intake mechanisms which are close to the longitudinal mid-plane, which guide elements extend upward from the bottom of the machine, ahead of, between, and/or rearward of the cutting and intake mechanisms, in order to guide the stream of material in this region and to prevent the development of a persistent free space in the region ahead of the intake channel of the field chopper, in which free space the plants are not supported and thus topple on their sides. These guide elements are adjusted to the shape of the neighboring cutting and intake mechanisms, and have a generally pointed structure at their forward and rear ends. The guide elements do not extend above the cutting and intake mechanism, and thus the upper parts of the plants are not supported.

A particular drawback of these machines is that the cutting and intake mechanisms close to the longitudinal mid-plane rotate in a direction which does not allow transport of the plants inwardly at the rear sides of said mechanisms; accordingly, a separate conveying means is needed in order to transport plants from the more outwardly disposed cutting and intake mechanisms toward the center of the machine. In U.S. Pat. No. 5,845,472, e.g., a screw conveyor is employed, whereas in the above-cited European patents so-called transverse conveying drums are employed. These separate conveyors are costly, and increase the weight and length of the machine in the direction of travel. In DE 36 23 380 A, plants incoming from outer regions are conveyed to the front side of the cutting and intake mechanisms; such machines have not proven successful in practice.

Machines have also been described in which, in a harvesting mode, the cutting and intake mechanisms close to the longitudinal mid-plane rotate such that the plants are first transported forwardly in the direction of the longitudinal mid-plane and outwardly. Examples occur in DE 195 27 607 A, DE 198 56 444 A, U.S. Pat. No. 5,722,225, U.S. Pat. No. 6,502,378, U.S. Pat. No. 6,658,832, and GB 2,012,154 A. This rotational direction makes it possible to transport the plants incoming from the outer regions via the rear sides of the cutting and intake mechanisms which are close to the longitudinal mid-plane. This transporting of plants can be supplemented by additional conveying elements in the form of transverse conveying drums (see the cited EP patents) or rotationally driven discharging wheels (DE 195 27 607 A) disposed in the region of the housings of the cutting and intake mechanisms. Also, transverse conveyors which operate independently from the cutting and intake mechanisms may be provided, as in DE 198 56 444 A.

In the machines according to DE 195 27 607 A, DE 198 56 444 A, and U.S. Pat. No. 5,722,225, guide elements are also provided, disposed between the cutting and intake mechanisms which are close to the longitudinal mid-plane, which guide elements extend rearwardly to a point slightly ahead of the intake channel of the field chopper. These guide elements are not higher than the conveying channel. Thus, they do not provide any support to the upper parts of the plants.

U.S. Pat. No. 6,502,378 proposes to provide a drivable conveying device in the center of the machine above the central cutting and intake mechanisms, which device is capable of returning plants which leave the transverse conveying channel back to said channel. The conveying device may be comprised of rolls or discs. It is effective only when the crop material has already left the conveying channel, and, in reverse mode, it cannot relieve any jam which may have developed. The subsequently published DE 103 14 859 A discloses a machine which is similar but has conveyors which rotate around a vertical axis which are disposed above the central cutting and intake mechanisms.

In U.S. Pat. No. 6,658,832, the guide element is attached to the bottom of the machine and ends abruptly at the rear side of the cutting and intake mechanisms. A rotatably mounted V-shaped roll is disposed over this location, which downwardly forces plant stalks which leave the transverse conveying channel. In reverse mode, in the event of a blockage, crop materials collect on the rear side of the guide element between the cutting and intake mechanisms which are close to the longitudinal mid-plane. The V-shaped roll is disposed an appreciable distance above the bottom of the machine, and thus is capable of only deflecting the upper parts of the plants, not the bottom parts of the stalks.

GB 2,012,154 A discloses a machine with only two cutting and intake mechanisms, with a guide element between them. In a plan view, it has a triangular shape, with a vertically downwardly extending rear wall. This machine can harvest only two rows at one time. Thus, one would not expect to even encounter the jamming problems which occur with the above-described machines which have greater operating width. An embodiment with a broader operating width is also illustrated, wherein the rear wall of the central guide element, disposed ahead of the intake channel of the field chopper, is oriented exactly transversely to the direction of travel. With this arrangement, it is again possible for a jam of materials to develop when in reverse mode.

Finally, U.S. Pat. No. 5,784,869 proposes a machine having intake chains, in which machine the plants are transported by a transverse screw conveyor. The bottom of the machine comprises a trough which partially surrounds the transverse conveying screw. A separator element, extending in the direction of travel, is disposed in the longitudinal mid-plane of the trough, which separator is intended to deflect the incoming crop material rearwardly. This machine has a configuration which fundamentally differs from the above-described machines.

The underlying problem of the present invention is deemed to be to devise a compact machine for mowing of stalk-like crop materials which eliminates or reduces the abovementioned drawbacks.

SUMMARY OF THE INVENTION

According to the present invention there is provided a novel crop guide arrangement for use with a harvesting machine having a plurality of cutting and intake mechanisms mounted side-by-side for rotation about respective upright axes.

It is proposed to provide a guide element in the center of the machine at the front side of the conveying channel wherein plants are conveyed to a field chopper, which guide element is disposed above said channel and has rearwardly and downwardly inclined surfaces. The configuration of said surfaces is adjusted to the course of said conveying channel, i.e., they are at an approximately constant distance from the channel over their entire length, and they open upward in a funnel-like manner.

The guide element forms a funnel configuration ahead of and above the conveying channel, which provides support, particularly in the event of high throughputs of plants. It interacts cooperatively with the parts of the plants which extend upward above the conveying channel. In reverse mode, the crop materials can slide upwardly on the rearward surfaces of the guide element, which tends to avoid jamming. When regular operation is then resumed, the crop material which is then drawn back in on the guide element passes downward automatically.

The described effects of the guide element are particularly advantageous when, in harvesting mode, the cutting and intake mechanisms which are close to the longitudinal mid-plane move outwardly (particularly, rotate outwardly), i.e. they convey the plants first outwardly and then inwardly. With this direction of rotation, the guide element provides improved guiding of the crop material. Another advantage consists of the fact that the intake mechanisms close to the longitudinal mid-plane can particularly well convey materials incoming from cutting and intake mechanisms disposed in the more outward regions, such conveying occurring namely on the rear sides of said inwardly dispose mechanisms.

As a rule, the flow of materials in the center of the machine is redirected from a transverse movement to a rearwardly directed movement. This redirection occurs preferably by means of inclined conveying drums, which drums also compensate for the height difference between the bottom of the machine and the intake channel of the field chopper. The guide element is advantageously adjusted to the curved shape of this conveying channel. In addition, two rearward surfaces of the guide element, disposed on respective sides of the longitudinal mid-plane of the machine, may be set at a mutual angle such that they form a rearwardly extending edge. In reverse mode, the crop material is deflected leftward or rightward from said edge, which avoids formation of jams.

A separator element may be provided which improves the division of the material flow when in reverse mode; said element extends rearwardly from the guide element, along the longitudinal mid-plane. In reverse mode, the separator acts in the manner of a knife to divide the crop material into two streams, one flowing leftward and one rightward. The cross section of the separator element is as a rule rectangular.

In order to return to the material stream plants which have fallen over and have strayed out of the conveying channel, it appears to be advantageous to provide frusto-conically shaped cover elements disposed on the upper side of the cutting and intake mechanisms. The cover elements rotate along with the cutting and intake mechanisms, so that the plants fall down again from said elements. When a cover element extends over the cutting and intake mechanisms, it serves also as a wiper which removes plants from the cover elements and returns them to the stream of material.

According to a special embodiment of the invention, a rotatable roll is disposed on the upper side of the guide element, which roll extends horizontally, transversely to the direction of travel. The roll may be actively driven or may rotate freely. By rotating, it enables one to avoid material jams, and under active rotation it facilitates loosening of material jams. The cross section of the roll is, in particular, rhomboidal.

The described direction of movement of the cutting and intake mechanisms is particularly advantageous with machines with relatively large cutting and intake mechanisms, in that, for the commonly used crop row separation distance, it enables harvesting of eight rows of corn simultaneously, using only four cutting and intake mechanisms, without the need for separate transverse conveying means.

BRIEF DESCRIPTION OF THE DRAWINGS

Two exemplary embodiments of the invention, which are illustrated in the drawings, are described in some detail hereinbelow.

DESCRIPTION OF THE PREFERRED EMBODIMENT

Figure 1:
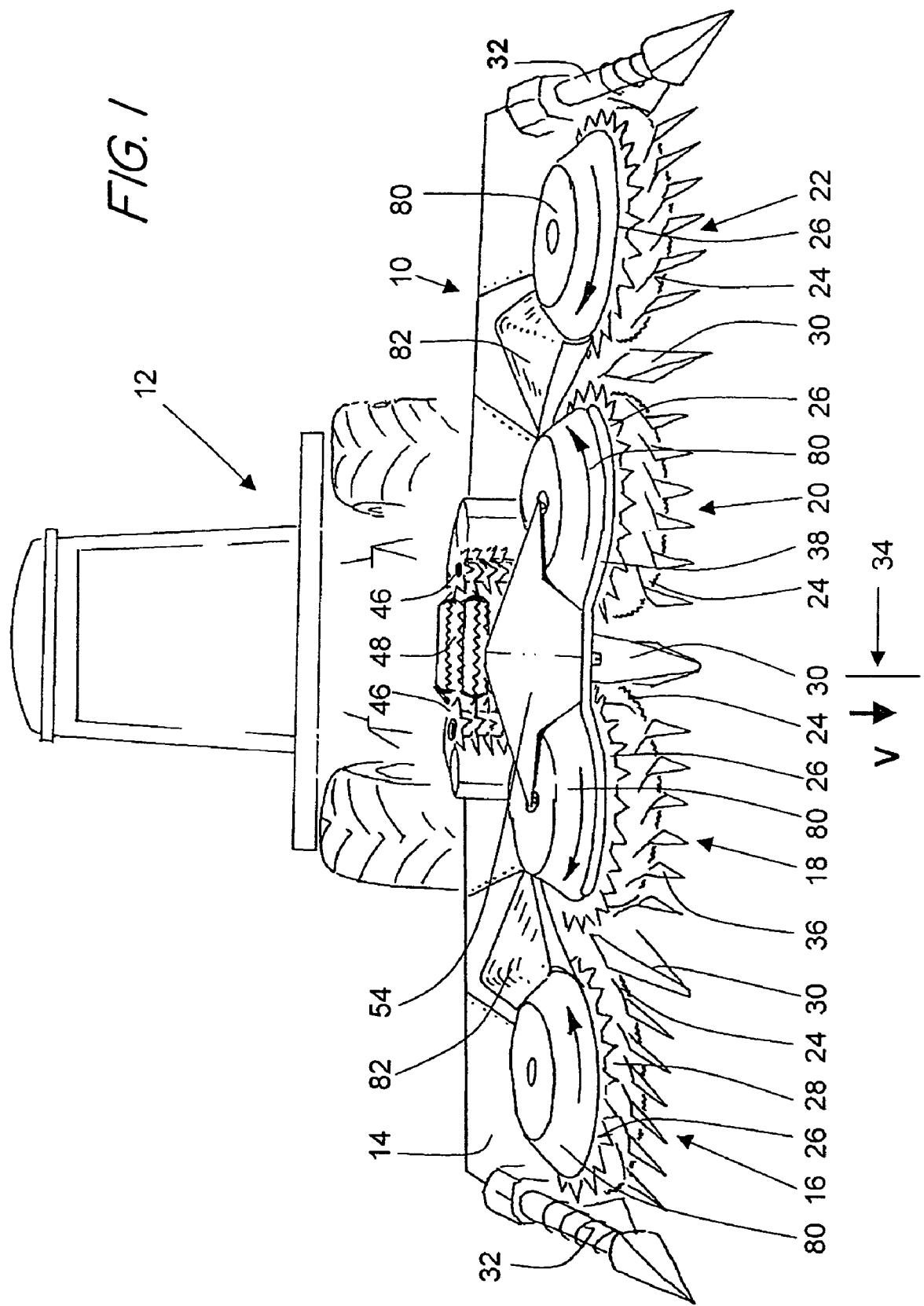
FIG. 1 is a perspective front view of a machine for mowing of stalk-like crops, and a field chopper to which said mowing machine is attached.

In FIG. 1, a perspective front view of a machine 10 for mowing of stalk-like crops (particularly corn) is shown. The machine 10 is attached to a self-propelled field chopper 12, and is moved by said chopper in a direction of travel V over a field in which harvesting is being conducted.

The machine 10 has a frame 14 on which four cutting and intake mechanisms (16, 18, 20, 22) are mounted side-by-side. Each such cutting and intake mechanism (16, 18, 20, 22) is comprised of a lower, actively rotatable mowing wheel 24 and a rotatable conveying wheel 26 disposed coaxially above said mowing wheel 24. The mowing wheels 24 have sharp teeth on their peripheries or are otherwise provided with sharp implement means, in order to cut off the plant stalk from the stump thereof which remains in the soil. The stalks are engaged in recesses 28 in the conveying wheels 26 and become transported to the field chopper 12 in the manner described below.

Figure 2:
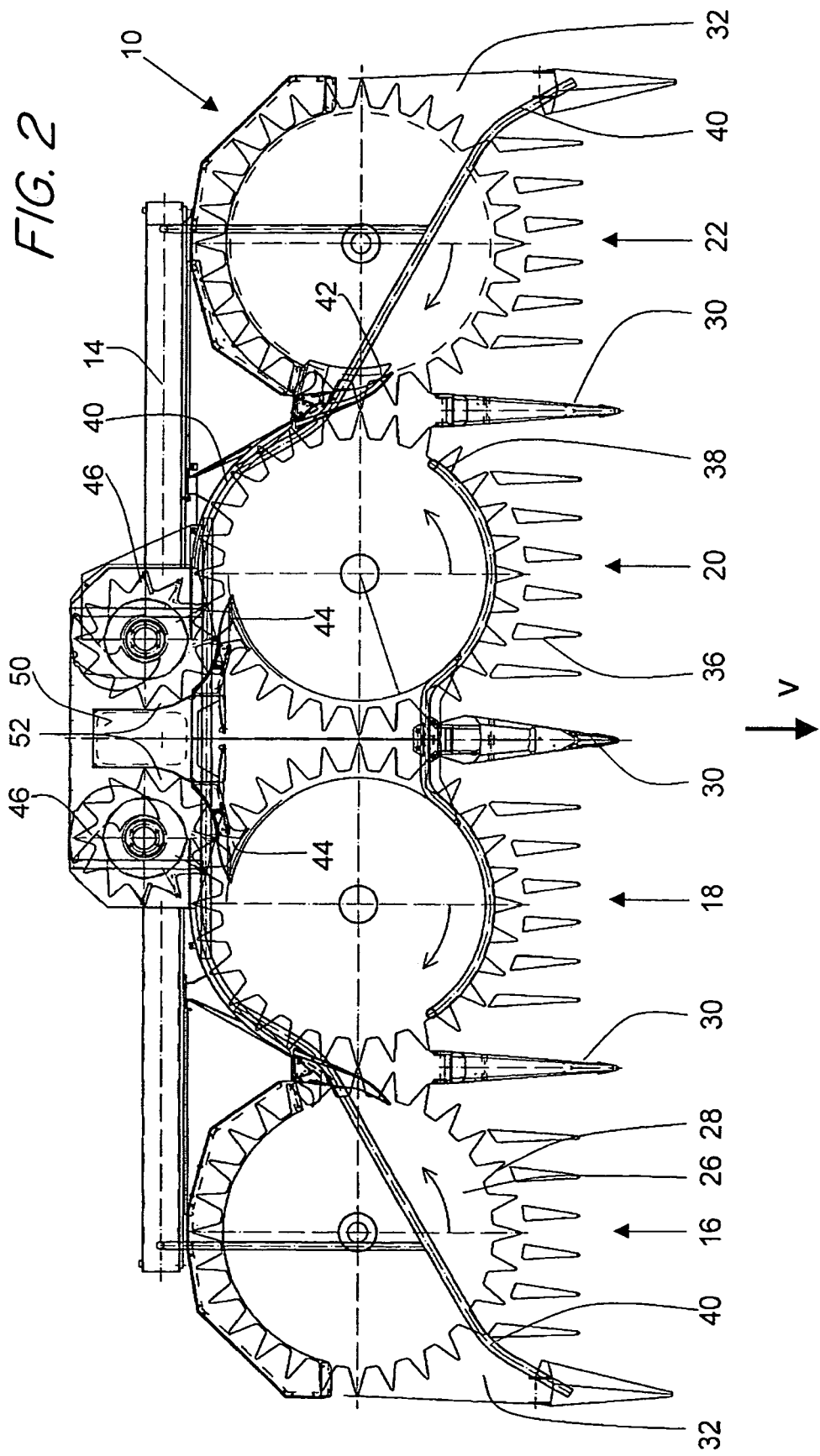
FIG. 2 is a plan view of the machine shown in FIG. 1.
Figure 3:
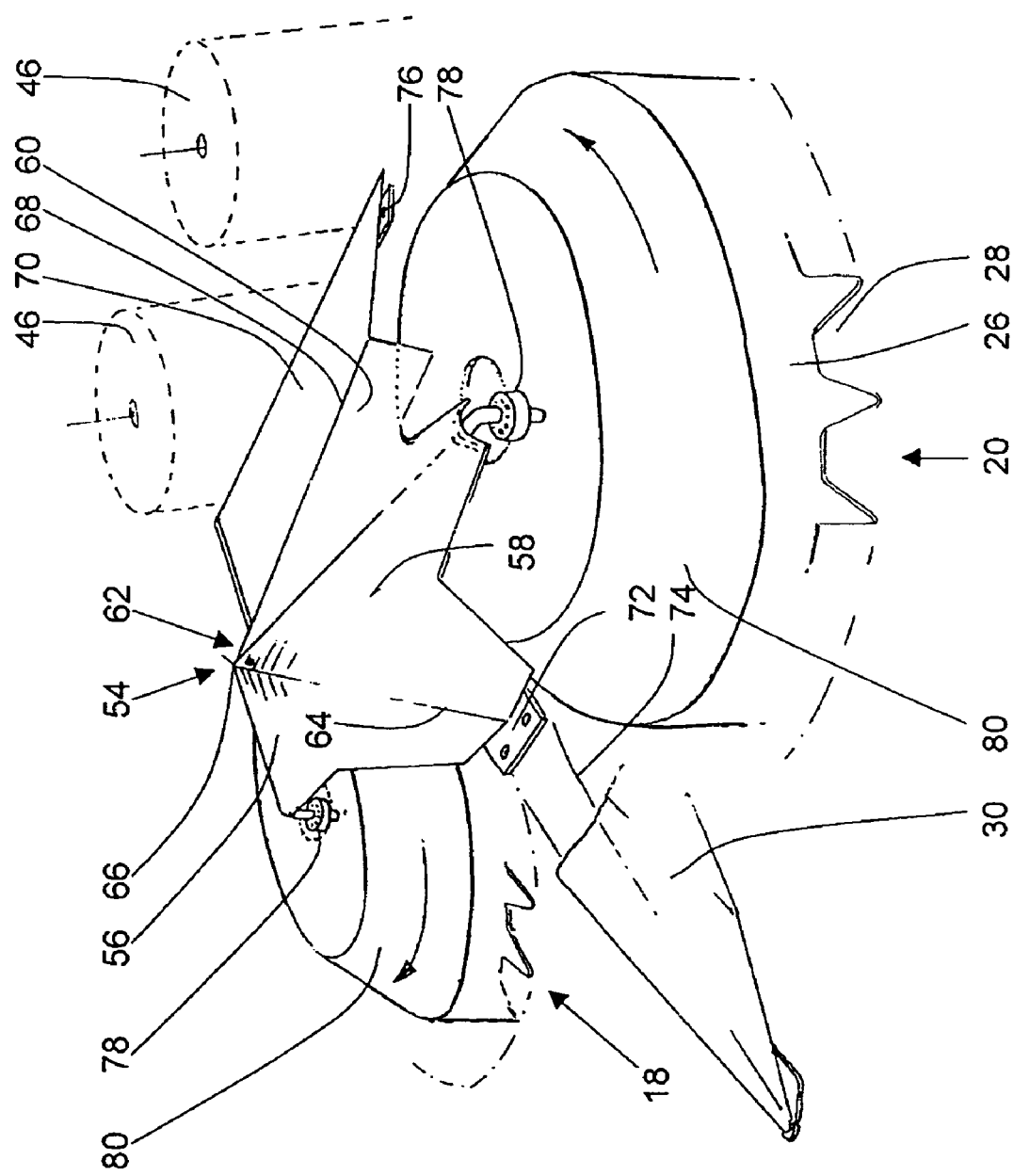
FIG. 3 is a perspective view of the interior cutting and intake mechanisms of the machine, with a guide element for the crop materials.

Between neighboring cutting and intake mechanisms (16, 18, 20, 22), stalk separators 30 are provided which, where necessary, deflect the plants laterally and bring them into the engagement regions of the cutting and intake mechanisms (16, 18, 20, 22). Power-operated stalk lifting screws 32 are disposed at the two outer sides of the machine 10. Smaller stalk separators 36 are disposed at the front sides of the cutting and intake mechanisms (16, 18, 20, 22). A curved, forward-pressing bar 38 is disposed at the forward side of the inner cutting and intake mechanisms (16, 18, 20, 22) which are close to a longitudinal mid-plane 34 of the machine 10. The bar 38 serves to push the plants forward, to facilitate their engagement by the cutting and intake mechanisms (18, 20). Referring to FIG. 2, it can be seen that similar forward-pressing bars 40 are disposed above the outer cutting and intake mechanisms (16, 22) and behind the central cutting and intake mechanisms (18, 20). The functioning and structure of the cutting and intake mechanisms (16, 18, 20, 22) are described in appreciable detail in EP 0,099,527 A. The working width of the cutting and intake mechanisms (16, 18, 20, 22) is about two crop rows each, which is about 1.5 meters each. Thus the machine 10 can harvest 8 rows of corn simultaneously.

When operating in a harvesting mode, the cutting and intake mechanisms (16, 18, 20, 22) rotate in the directions indicated by the arrows. The inner cutting and intake mechanisms (18, 20), which are close to the longitudinal mid-plane 34 of the machine 10, convey the plants first outward and then rearward, whereas the outer cutting and intake mechanisms (16, 22) rotate in opposite directions to their neighboring cutting and intake mechanisms (18, 20). As may be seen from FIG. 2, the outer cutting and intake mechanisms (16, 22) deliver their crop materials to the inner cutting and intake mechanisms (18, 20) at a location approximately midway between the rotational axes of the respective mechanisms (16 and 18), (20 and 22). Respective removal or stripper elements 42 are provided to facilitate this. On the rear side of the inner cutting and intake mechanisms (18, 20), the crop material is removed from the recesses 28 by means of additional removal or stripper elements 44, and said material is delivered to inclined conveying drums 46 which rotate around slightly forwardly inclined axes and which compensate for the difference in height between the bottom of the machine 10 and the following intake rolls 48 of the intake channel of the field chopper 12.

A conveying-canal limitation element 50 is disposed between the oblique conveying drums 46. The limitation element 50 is adjusted to the envelope cylinder of the conveying drums 46, and each of its two sides forms a conveying channel 52 between itself and the corresponding conveying drum 46, which channel extends in a curved path from the removal element 44 at the rear side of the inner cutting and intake mechanism (18, 20) to a point shortly ahead of the entrance of the intake channel of the field chopper 12. The rear end of the conveying-channel limitation element 50 extends transversely to the direction of travel and approximately vertically upward from the bottom of the machine 10. The height of the conveying-channel limitation element 50 corresponds to the height of the conveying channel 52, which channel extends from the bottom of the machine 10 to the height of the uppermost intake wheel 26 of the cutting and intake mechanisms (16, 18, 20, 22). It should be noted that the inclined conveying drums 46 also have conveying wheels above the conveying channel 52, but the diameter of these is as a rule smaller than that of the conveying wheels of the inclined conveying drums 46 which conveying wheels operate in the conveying channel 52.

To improve the conveying of materials in the harvesting mode and in a reverse mode, a guide element 54 is provided on the machine 10. It is disposed between and above the inner cutting and intake mechanisms (18, 20), and is comprised of two forward surfaces (56, 58) and two rearward surfaces (60, 62). The forward surfaces (56, 58) are disposed forwardly (reckoned in the direction of travel V), and include between themselves a relatively oblique angle which forms a forward edge 64 which extends in a forward and downward incline from an upper apex 66, in the longitudinal mid-plane 34. The upper edges of the forward surfaces (56, 58) extend laterally and downwardly from the upper apex 66 (disposed on the longitudinal mid-plane 34 of the machine 10), on each side. The rearward surfaces (60, 62) are disposed analogously rearwardly with respect to the direction of travel V. The rearward surfaces (60, 62) include between them an angle which is relatively acute which forms a rearward edge 68 which extends in a rearward and downward incline from the upper apex 66. The upper edges of the rearward surfaces (60, 62) which adjoin the upper edges of the forward surfaces (56, 58) also extend laterally and downwardly from the upper apex 66, on each side. Thus taken together the surfaces 56, 58, 60, and 62 have the general form of a pointed roof or pyramid.

The rearward edge 68 is adjoined by (has connected to it) a separator element 70 having a rectangular cross section, which element 70 extends rearward from an upper end slightly below the upper apex 66 along the rearward edge 68, in the longitudinal mid-plane 34, thus forming a kind of coxcomb configuration. The separator element 70 is preferably bonded to the edge 68 over the entire length, preferably by welding.

The guide element 54 and separator element 70 are attached to the machine 10 at four points. The guide element 54 has a lug 72 on the underside of the forward edge 64, which lug has holes in it for screwing to a support 74 of the central stalk separator 30. The separator element 70 also has a lug 76 fastened to its lower end, which lug is screwed to the upper side of the conveying-channel limitation element 50. The lateral ends of the surfaces (56, 62; 58, 60) are connected to respective pivots 78 which are mounted to respective cover elements 80 on the upper sides of the cutting and intake mechanisms (18, 20). Each such cover element 80 has a frusto-conical shape, with the upper surface having the smaller diameter. Such cover elements 80 are also disposed on the outer cutting and intake mechanisms (16, 22). The cover elements 80 are rigidly connected to their cutting and intake mechanisms (16, 18, 20, 22), and rotate along with them. Any plants which may come to rest on the cover elements 80 of the central cutting and intake mechanisms (18, 20) are passed rearward and downward by the guide element 54, whence they can be conveyed further along with the plants being transported in the conveying channel 52.

The guide element 54 and separator element 70 are disposed above the conveying channel 52. Together with the cover elements 80, they form above the conveying channel 52 the forward side of a broad funnel-shaped guide channel in which the upper parts of the plants are supported and guided, and which has a generally constant distance from the guide channel 52 over its entire length. The rearward surfaces (60, 62) and the rearwardly and downwardly extending edge 68 and the separator element 70 form a circular arc, analogous to the shape of the conveying-channel limitation element 50, wherewith the rotational axis of the inclined conveying drum 46 is at the center of said arc. With the indicated directions of rotation of the central cutting and intake mechanisms (18, 20), in this way the flow of material is improved. The rearward surfaces (60, 62), and in particular the separation element 70, serve to guide all plant stalks toward the center of the intake channel of the field chopper. In the absence of a separator element 70, individual plant stalks could impinge on the front side of the inclined conveyor drum on the side opposite to that from which the plants come, possibly resulting in jamming of material.

When the apparatus is reversed (in the reverse mode), the flow of material is divided into two streams, by virtue of the prominence formed by the rearward surfaces (60, 62) and the separator element 70; these streams are deflected leftward or rightward, respectively, transversely to the direction of travel. Because the rearward surfaces (60, 62) and the separator element 70 incline downward and rearward, the crop material disposed adjacent to them can be pushed upward before it forms a jam; and later it can stream back downward into the conveying channel 52. Thus, in the reverse mode, no crop material is deposited between the inner cutting and intake mechanisms (18, 20); accordingly, the reverse mode facilitates the subsequent operation, particularly the subsequent take-up and conveyance of the crop material. The forward surfaces (56, 58) and forward edge 64 can guide the flow of material to the front side of the machine 10.

In FIG. 1, one may also see additional guide elements 82 on the rear side of the machine 10, between respective outer and inner cutting and intake mechanisms (16, 18; 22, 20). They have surfaces which are inclined rearwardly and upwardly, which, analogously to the guide element 54, form a funnel-like upward extension of the conveying channel 52. The guide elements 82 are preferably releasably mounted, to allow rapid and easy replacement in the event of wear; however, they may be permanently attached to the machine 10. The guide elements 82 may extend to the center of the machine 20, in particular up to the inclined conveying drums 46.

Figure 4:
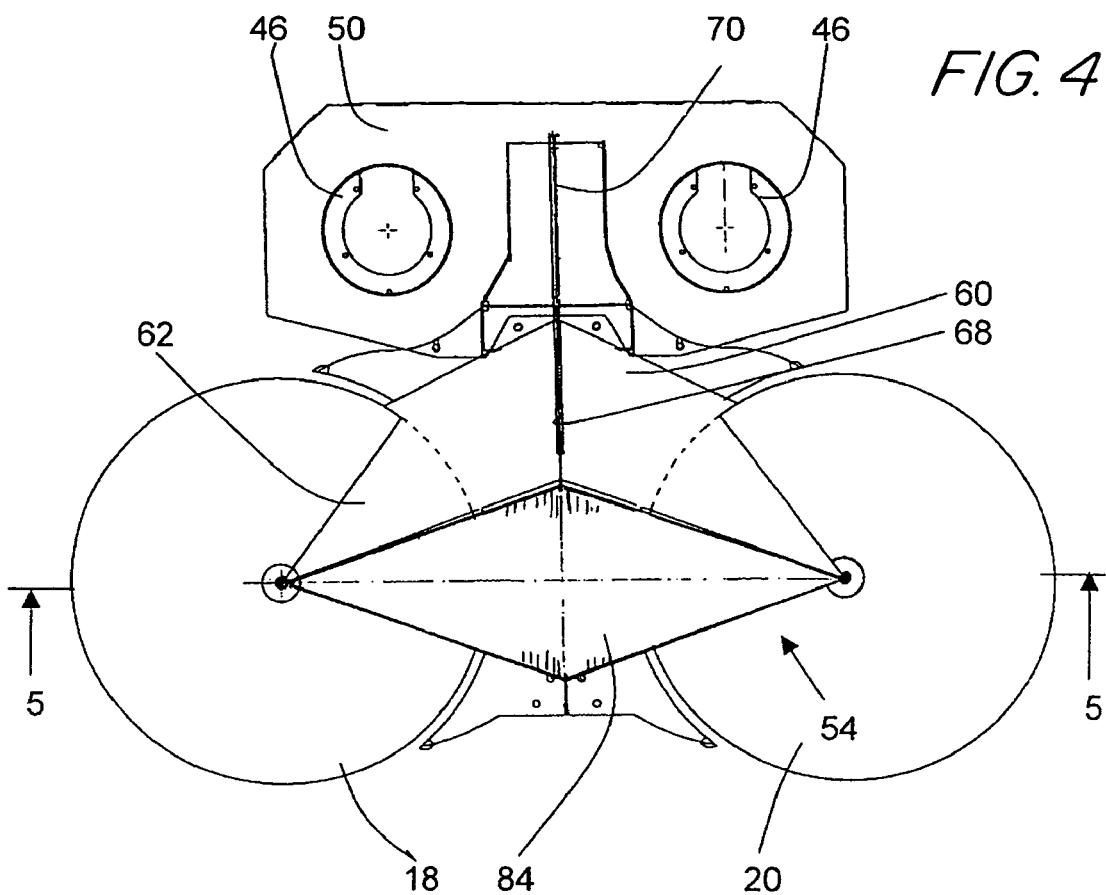
FIG. 4 is a partial cross section of the plan view of a machine having a second embodiment of a guide element.
Figure 5:
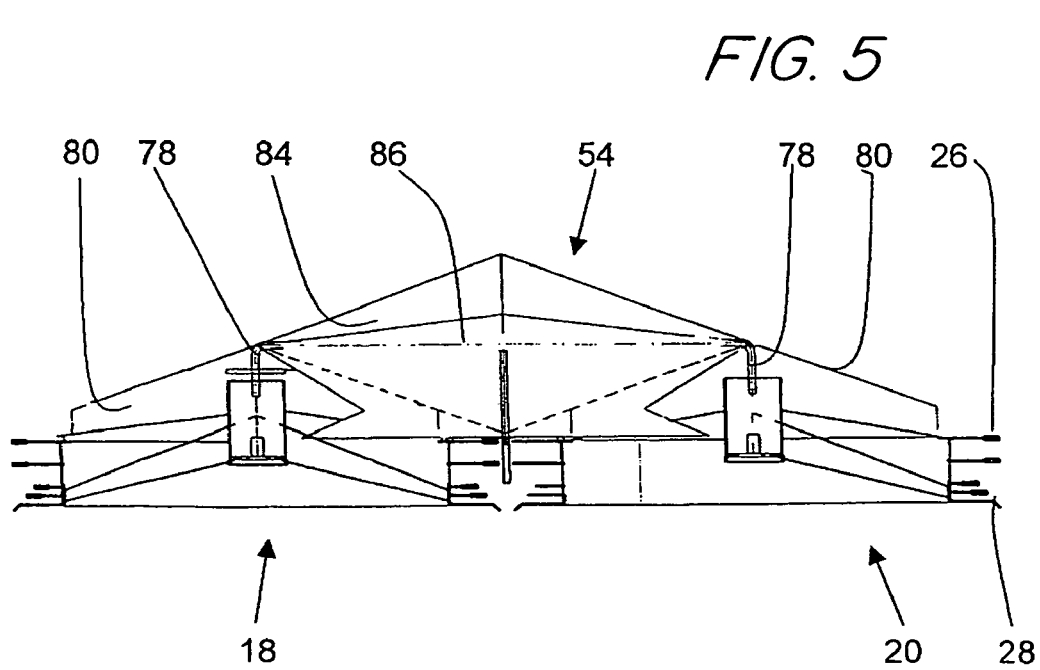
FIG. 5 is a vertical sectional view taken along line 5—5 of FIG. 4.

FIGS. 4 and 5 illustrate a second embodiment of a guide element 54. As with the first embodiment, the element 54 has on its rear side rearwardly and downwardly inclining surfaces (60, 62) and a separator element 70 which extends in the longitudinal mid-plane 34. However the upper part of the guide element 54 is formed by a roll 84 which is mounted so as to be rotatable around a horizontal axis 86 extending transversely to the direction of travel. Also similarly to the first embodiment, the roll 84 is supported on the central cutting and intake mechanisms (18, 20) by means of pivots 78. Roll 84 has a rhomboidal cross section. Accordingly, its rearward surface is inclined rearwardly and downwardly. An advantage of the rotatable roll 84 lies in the fact that it provides certain compliance in the form of rotatability, which can assist in avoiding jams in the first place, or in relieving jams which might occur. If a miter gear drive is installed between the rotational axle of the cutting and intake mechanism 20 and the roll 84, the roll 84 can be actively driven in rotation. A direct rotational drive may also be provided, e.g. with the roll 84 being friction driven via the surface of one of the cover elements 80.

In the reverse mode, the driven elements of the machine 10 have directions of rotation which are opposite to those described hereinabove for the harvesting mode.

Having described the preferred embodiment, it will become apparent that various modifications can be made without departing from the scope of the invention as defined in the accompanying claims.

The invention claimed is:

1. In a machine for mowing stalk-like crops, having cutting and intake mechanisms arranged side by side, for cutting and conveying of the crop material, wherewith at least one adjacent pair of such cutting and intake mechanism are disposed one each on each side of a longitudinal midplane of the machine, said machine further having a cut crop guide element disposed in the center of the machine above, and at the forward side of, a conveying channel in which the plants being harvested are conveyed actively to an intake channel of a field chopper, the improvement comprising: said guide element including surfaces which are disposed at a distance from the conveying channel and are disposed relative to said conveying channel so as to extend upward from said conveying channel in a funnel-like manner, wherein, when said machine is in a harvesting mode, the direction of movement of said at least one pair of cutting and intake mechanisms is such that the plants are transported first outward and then rearward and wherein said conveying channel is located at said mid-plane in a location ahead of said intake channel of said field chopper and includes a transition, which follows a circular arc, from a direction transverse to the direction of travel to a rearward direction.

2. The machine, as defined in claim 1, wherein said surfaces of said guide element include two rearward surfaces respectively on a respective side of said longitudinal mid-plane of said machine; said two rearward surfaces being disposed at a mutual angle and being joined to form a rearwardly directed edge.

3. The machine, as defined in claim 2, and further including an upright separator element joined to said guide element at said rearwardly directed edge.

4. The machine, as defined in claim 1, wherein a frusto-conical shaped cover element is mounted to each of said pair of cutting and intake mechanisms.

5. The machine, as defined in claim 4, wherein said guide element extends over a portion of the cover elements mounted to said pair of cutting and intake mechanisms.

6. The machine, as defined in claim 1, wherein said pair of cutting and intake mechanisms have a diameter which enables harvesting of two rows of corn grown at a distance between rows of 75 cm.

7. The machine, as defined in claim 1, wherein a second guide element is disposed behind at least one of said cutting and intake mechanisms, and above said conveying channel.

8. In a machine for mowing stalk-like crops, having cutting and intake mechanisms arranged side by side, for cutting and conveying of the crop material, wherewith at least one adjacent pair of such cutting and intake mechanism are disposed one each on each side of a longitudinal mid-plane of the machine, said machine further having a cut crop guide element disposed in the center of the machine above, and at the forward side of, a conveying channel in which the plants being harvested are conveyed actively to an intake channel of a field chopper, the improvement comprising: said guide element including surfaces which are disposed at a distance from the conveying channel and are disposed relative to said conveying channel so as to extend upward from said conveying channel in a funnel-like manner and, wherein said guide element includes a roll mounted for rotation about an axis which extends horizontally, transversely to the direction of travel.

9. The machine, as defined in claim 8, wherein said roll, when considered in a cross section taken through its rotational axis, is rhomboidal.

* * * * *